(12) United States Patent
Johnson et al.

(10) Patent No.: US 7,239,876 B2
(45) Date of Patent: Jul. 3, 2007

(54) METHOD FOR INCREASED LOCATION RECEIVER SENSITIVITY

(75) Inventors: Mark J. Johnson, Cary, IL (US); Ralph D'Souza, Sunrise, FL (US)

(73) Assignee: Motorola, Inc., Schaumburg, IL (US)

( * ) Notice: Subject to any disclaimer, the term of this patent is extended or adjusted under 35 U.S.C. 154(b) by 996 days.

(21) Appl. No.: 09/947,694

(22) Filed: Sep. 6, 2001

(65) Prior Publication Data

US 2003/0043941 A1    Mar. 6, 2003

(51) Int. Cl.
*H04Q 7/20* (2006.01)
*H04B 1/10* (2006.01)

(52) U.S. Cl. ............... 455/456.1; 455/456.5; 455/303; 342/457

(58) Field of Classification Search ........ 455/302, 455/303, 304 P, 305, 306, 456.1, 456.5, 296, 455/254, 63.1; 342/457, 458
See application file for complete search history.

(56) References Cited

U.S. PATENT DOCUMENTS

| | | | |
|---|---|---|---|
| 5,109,390 A * | 4/1992 | Gilhousen et al. | 370/335 |
| 5,630,208 A * | 5/1997 | Enge et al. | 455/65 |
| 6,047,192 A * | 4/2000 | Maloney et al. | 455/456.2 |
| 6,201,499 B1 * | 3/2001 | Hawkes et al. | 342/387 |
| 6,430,416 B1 * | 8/2002 | Loomis | 455/456.1 |

* cited by examiner

*Primary Examiner*—Edward F. Urban
*Assistant Examiner*—Blane J Jackson
(74) *Attorney, Agent, or Firm*—Terri S. Hughes; Valerie M. Davis

(57) ABSTRACT

A first image (200) of a transmitted signal is detected within a received signal containing a plurality of images of the transmitted signal. This is accomplished by detecting a second image (210) of the transmitted signal. A set of characteristics of the second image of the transmitted signal is determined, and subsequently used to detect the first image (200) of the transmitted signal.

19 Claims, 3 Drawing Sheets

METHOD FOR INCREASED LOCATION RECEIVER SENSITIVITY

FIELD OF THE INVENTION

The present invention relates generally to a method for improving sensitivity of a receiver to a specific image of a signal.

BACKGROUND OF THE INVENTION

In communications systems, multipath is a well-understood phenomenon. Signals propagate from a transmitter to varying degrees in all directions. While one image of the signal (known in the art as the direct-path image) travels in a straight line from the transmitter to the receiver, other images are reflected from any number of surfaces and arrive at the receiver at other times, those times being largely dependent on the length of the path traveled from the transmitter to the receiver.

Aside from well-understood issues of fading and destructive interference, multi-path propagation is generally welcomed in the communications arena. In most cases, the direct-path image must penetrate several obstacles before arriving at the receiver. Given a large number of images of the signal following other paths between the transmitter and receiver, it is likely that many of them will penetrate fewer obstacles and experience less attenuation than the direct-path image. Since all images of the signal carry the same information, it is unimportant which particular image is detected and decoded. Thus, the arrival of stronger images that arrive at the receiver by other paths is generally beneficial.

Unfortunately, however, the receiver receiving multipath images of a signal from various paths is not beneficial for location systems. While signals in location systems generally carry some information modulated onto them by the transmitter, the primary purpose of detection of these signals is to gain physical information that indicates the spatial relationship between the receiver and the transmitter. Signal strength or received signal strength information ("RSSI") systems estimate the distance from a transmitter to a receiver based on the strength of the arriving signal, assuming that the signal is attenuated roughly 6 db each time the distance doubles. Angle-of-arrival ("AOA") systems estimate the direction of the transmitter from the receiver based on the angle from which the detected signal arrived. Timing-based systems, such as ranging or time difference of arrival ("TDOA") systems, estimate distances in a system based on the arrival time of signals at receivers, using the approximation that the signals propagate at a constant speed. In all of these cases, detection of an image of the signal other than the direct path image is disruptive, since these other images will generally have different amplitudes, come from different directions, and arrive at different times than the direct-path image.

Because of these considerations, a location system must be capable of detecting and characterizing the direct-path image despite interference from other images of the same transmitted signal. Rejecting images other than the direct path image cannot be accomplished by simple filtering or averaging, since the interfering image is, unlike noise or other emissions, highly correlated with the desired image. For this reason, many location systems use broadband spread-spectrum techniques. Two images of a signal appear as distinct entities if their arrival times differ by a factor on the order of the inverse of the occupied bandwidth. It is generally valid to assume that the image arriving earliest is the direct-path image, since the overwhelming majority of the propagation of any signal is through air on the Earth's surface, and the propagation speed of the signal is substantially equal to the speed of light in free space.

While using broadband modulation addresses the issue of distinguishing the direct-path image from other images arriving along substantially different paths, it assumes that the direct-path signal is strong enough to be detectable. As mentioned previously, the direct-path signal is usually not the strongest, as it must generally penetrate multiple barriers, such as walls, floors, vehicles, or buildings before reaching the receiver. This issue is compounded by the fact that, while a single connection between a transmitter and a receiver is adequate for communication, most location systems require characterization of the propagation paths between the transmitter and several receivers, increasing the required system density significantly. It is well known in the art that, by significantly reducing the information capacity of a system relative to its bandwidth (e.g., by sending largely redundant information), it is possible to increase the effective gain of the system. This increase is called coding gain. Direct sequence spread spectrum ("DSSS") is one implementation of this technique, and is used extensively by modem broadband location systems, including the Global Positioning System, ("GPS"). A pseudonoise (PN) code is superimposed on the data, generally at a higher modulation rate than the data itself. The receiver is given a priori knowledge of the PN code. The rate at which symbols are modulated onto a carrier is called the chipping rate, and determines the bandwidth of the signal. The rate at which information is transmitted is called the bit rate, and determines the utilized bandwidth. The ratio is the number of chips per bit, and establishes the coding gain for a particular bandwidth. The coding gain may be approximated as $3 \text{ db} * \log_2(N)$, where N is the number of chips per bit. Coherent averaging, which takes into account signal phase as well as amplitude, is possible over the number of chips in a bit because the receiver knows the pattern of the chips within a bit a priori. Because the receiver must know this pattern, it cannot contain any information; in information theory, information is by definition unknown to the receiver, and any data in a message (such as the PN code) that is known to the receiver before the message is detected is not considered information. This is why the tradeoff between coding gain and information rate becomes possible.

The teaching of prior art communication systems design is that coherent averaging to improve the detection of a digital signal can be performed only over a length of time corresponding to the duration of one information symbol or less. A symbol is a quantum of information, which corresponds to one bit in the binary system. The reason for this is that the symbol carries information and, as such, its state cannot be determined a priori by a receiver. If the receiver were to have a priori knowledge of the state of a symbol, information theory holds that no information would be contained therein.

This technique, however, is not without its disadvantages. Most location systems send at least some data with location transmissions. Examples of data needed to supplement location transmissions includes transmitter identification, ephemeris or status data, alerts, configuration data, and control information. Given a particular amount of data to be sent in a location transmission, for each 3 db increase in bandwidth, the duration of the transmission must be doubled. This reduces system capacity and battery life proportionally. Some implementations add a known synchronization pattern to the message in addition to the transmitted data to improve the detection sensitivity. This could be regarded as the sending of two distinct signals, one for location characterization and one for data. It is obvious that this also increases power consumption and decreases system capacity.

Thus, there exists a need for a technique that is capable of utilizing the entirety of the transmitted signal to improve the sensitivity of the receiver to the direct-path image of the signal, without imposing excessive limitations on the amount of information that may be sent with the message.

BRIEF DESCRIPTION OF THE DRAWINGS

A preferred embodiment of the invention is now described, by way of example only, with reference to the accompanying drawings in which.

DETAILED DESCRIPTION OF THE PREFERRED EMBODIMENT

For simplicity, the following discussion of the present invention assumes that the target device to be located is a transmitter, and the network devices, at known locations, are receivers. Such a configuration is practical in systems employing RSSI, AOA, TDOA, ranging, and other techniques known in the art. It will be clear to those skilled in the art that the present invention applies generically to any receiver, and is equally applicable to a system, such as GPS, wherein the target device is a receiver and the network devices are transmitters.

Figure 1:
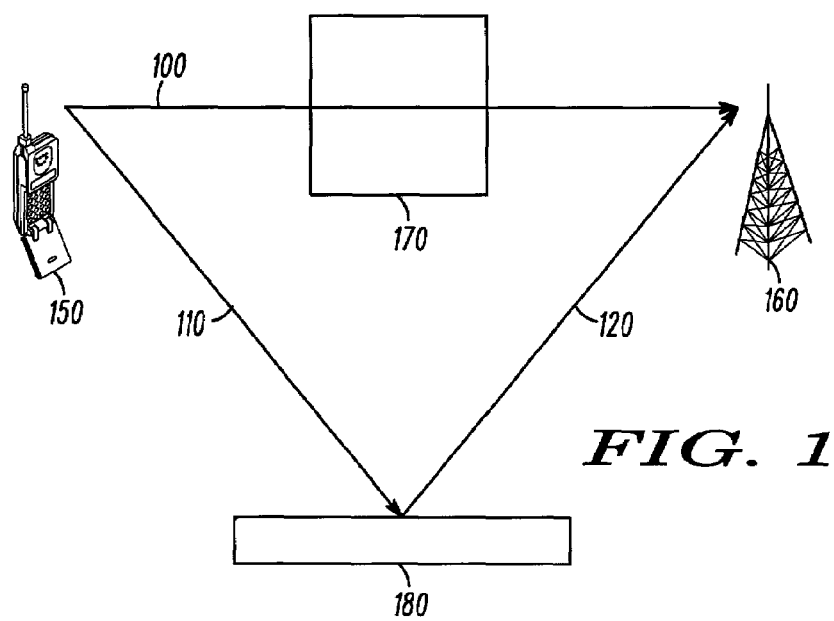
FIG. 1 illustrates the geometric basis of a network-based implementation of the present invention as implemented by two network devices belonging to a location system.

Referring to FIG. 1, a common scenario is depicted in which a first image of a signal (referred to as the direct-path image, because it is following the most direct path between the transmitter and receiver) traveling a first path 100 from a transmitter 150 to a receiver 160 is blocked by an attenuating obstacle 170. The first path 100, or direct path, is by definition the shortest propagation route between the transmitter 150 and the receiver 160, and may be approximated as a straight-line segment between the transmitter 150 and the receiver 160. Simultaneously, a second image of the same signal travels along a second path 110 to a reflective object 180, and after reflecting from the object 180, travels along a third path 120 to the receiver 160. Images of the signal, such as this second image, are referred to as secondary images; the term "secondary image" encompasses all images other than the direct-path image. Because the secondary image does not penetrate any attenuating obstacles that absorb or reflect its power, and the direct-path image passes through the attenuating obstacle 170, the amplitude of the secondary image at the receiver 160 is larger than the amplitude of the direct-path image at the receiver 160. Because the sum of the lengths of the second path 110 and the third path 120 traveled by the secondary image is greater than the length of the path 100 traveled by the direct-path image, the secondary image arrives at the receiver 160 at a later time than the direct-path image.

Figure 2:
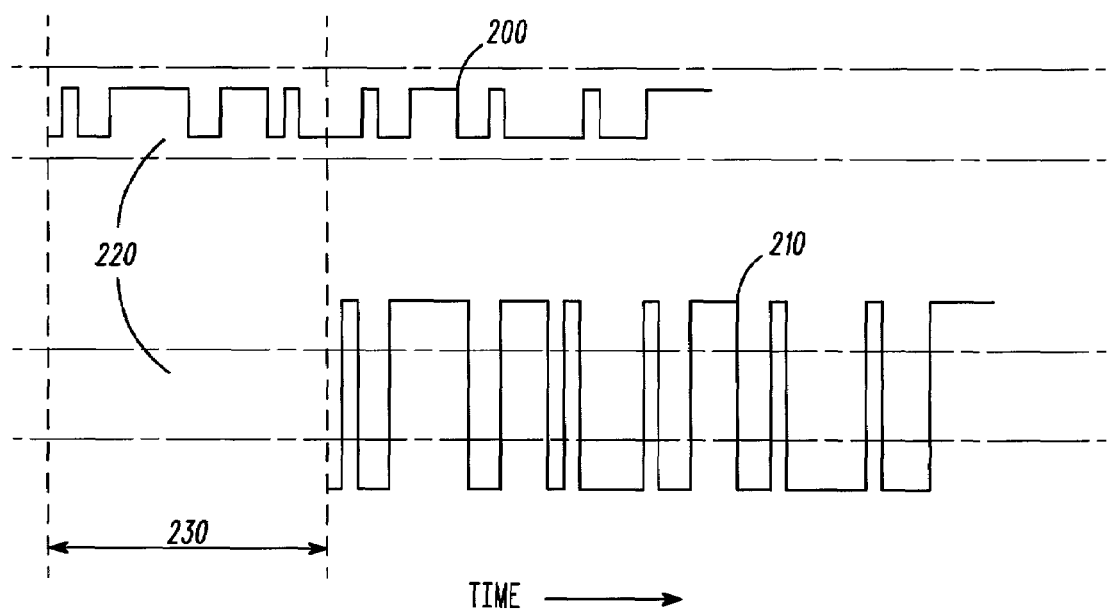
FIG. 2 illustrates the details of the timing of the signals transmitted and detected by the devices of FIG. 1.

Referring to FIG. 2, the direct path image 200 of the signal transmitted by the transmitter 150 and having traveled along the first path 100 to the receiver 160 is shown along with a secondary image 210 having traveled from the transmitter 150 to the receiver 160 along the paths 110, 120 as described above. For simplicity, this discussion will assume that the images 200, 210 are the only significant images arriving at the receiver 160. Due to the conditions depicted in FIG. 1, the secondary image 210 arrives at the receiver at a later time and with higher amplitude than the direct-path signal 200. The arrival time of the secondary image 210 differs from that of the direct-path image 200 by a delay 230, representing the difference in the length of the paths traveled by the two signals 200, 210. For simplicity, each image is represented by the demodulated data signal that would result from ideal detection of the respective image. Both images are drawn superimposed on a receiver sensitivity limit 220. It can be seen that, while the secondary image 210 is larger than the receiver sensitivity limit 220, the direct-path image 200 is below the sensitivity limit 220 and would not be detected using the techniques of the prior art. Thus, in the prior art, the secondary image 210 would be identified as the earliest arriving image and would be erroneously assumed to be the direct-path image 200, with corresponding detrimental effects on any attempt to estimate the location of the transmitter 150 based on the amplitude, angle of arrival, time of arrival, or any other characteristics of the secondary image 210.

The present invention observes that, in a multipath environment, one is dealing with distinct images of a single signal. While one necessary purpose of this signal may be to convey information from a transmitter 150 to a receiver 160, a location system has the primary purpose of characterizing physical properties of the direct-path image 200 of the transmitted signal, such as arrival time, phase, or amplitude. The sensitivity requirement for detecting a direct-path image 200 is generally more difficult than for a secondary image 210 because the amplitude of the direct-path image is usually lower than that of the most prominent secondary images, and because secondary images constitute a source of interference with the direct-path image. The present invention proposes to dramatically increase the coding gain for the direct path image 200 by reducing its information content without increasing the length of the transmission. This will offer a coding gain on the order of 3 db*$\log_2(N)$, where N is the number of symbols in the message.

According to current information theory, an image of a signal carries no information if the receiver, independent of the detection of the image, knows the information modulated onto the signal. The present invention proposes that such information about the direct-path image 200 of the signal is contained in the secondary image 210 of the signal. Since, in real-world terrestrial location applications, there almost invariably exist secondary images of the signal that are much larger in amplitude than the direct-path image at the receiver 160, the detection of at least some of these secondary images 210 may be assumed to be generally easier than the detection of a direct-path image 200.

Therefore, the present invention proposes that the receiver 160 may detect the secondary image 210 of the signal. The receiver 160 then has knowledge of the information content of the secondary image 210 (for example, the sequence of bits sent by the transmitter 150). Since all other images of the transmitted signal are representative of the same transmission, the information content of any image of the signal, including the direct-path image 200, is reduced by the amount of information gleaned from the secondary image 210. In practical terms, nearly all of the information modulated onto the transmitted signal can be determined by the receiver 160 in the process of detecting the secondary image 200. As no image of the signal, including the direct-path image 200, has significant information content, coherent averaging is theoretically possible over the entire length of the image rather than over a single bit. If there are N bits in the signal sent by the transmitter 150, using the knowledge of the bits of the secondary image 210 to detect the direct-path image 200 enables a coding gain of 3 db*$\log_2(N)$.

It will be appreciated by those skilled in the art of electromagnetic propagation that this scenario represents an unrealistically simple description of a typical real-world terrestrial propagation scenario, which would usually include dozens to hundreds of secondary images 210 of the transmitted signal, arriving at the receiver 160 at various times and with various amplitudes and phases. The received signal at the receiver 160 is the sum of all of these images, along with any other noise and interference. For the purpose of the present discussion, it is adequate to assume that the secondary image 210 represents an easily detected member of the large set of secondary images.

Figure 3:
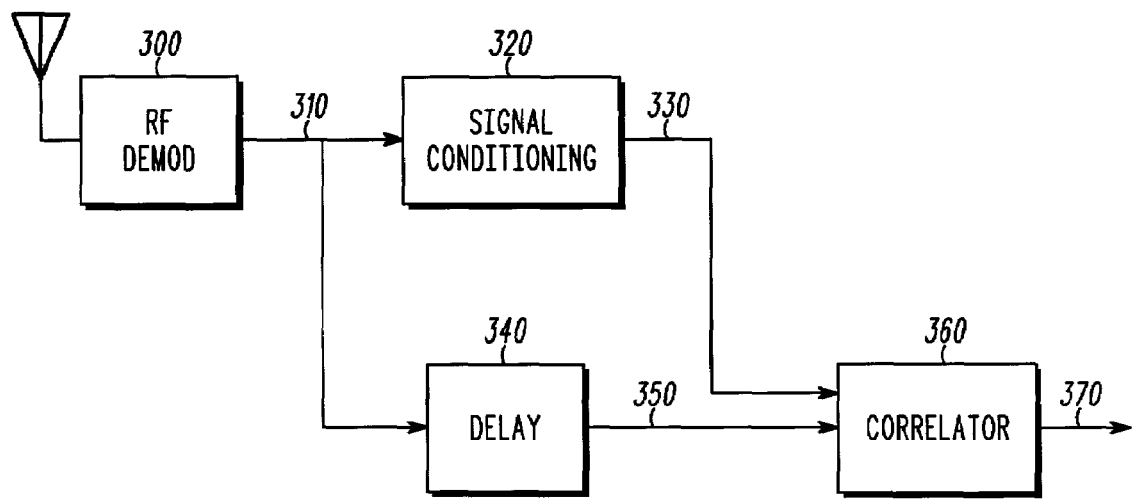
FIG. 3 illustrates an elementary implementation of the present invention, wherein the detected waveform is assumed to be representative of the transmitted signal.

There are a variety of approaches to modeling the original signal. FIG. 3 illustrates a typical receiver structure in which the radio frequency ("RF") section 300 converts the received signal to a received waveform 310, represented in either analog or digitized format. This step may optionally include such operations as frequency translation, signal conditioning, and filtering. The waveform of the transmitted signal is one of the most basic characteristics. The received waveform may be represented in any appropriate analog or digital format, with any resolution required for the application. The waveform 310 may be subjected to additional signal conditioning 320, which may include, but is not limited to, filtering, limiting, companding, or other operations appropriate to the modulation used. The result of this optional additional processing is the comparison waveform 330. If no additional processing is applied, the comparison waveform 330 will be identical to the received waveform 310.

In accordance with the implementation of the present invention illustrated in FIG. 3, it is assumed that there exists a dominant image of the signal, such that the comparison waveform 330 substantially represents the dominant image. This is the case in the two-ray example described in FIG. 1, and it is a reasonable assumption in many real-world cases. The sensitivity improvement effected by the present invention is directly related to the degree of similarity between the comparison waveform 330 and the transmitted signal.

If the comparison waveform 330 representing the conditioned received signal can be assumed to reasonably represent the transmitted signal, the comparison waveform 330 may then be passed to the correlator 360 for comparison with the delayed received waveform 350. In the preferred embodiment, the correlator 360 compares the conditioned received waveform 330 with the delayed received waveform 350 by a convolution operation, which involves integration of the products of those waveforms over a window in time for many values of delay 340. When the delay 340 is equal to the difference 230 in the arrival times of the direct-path image 200 and the secondary image 210 (plus the delay, if any, through the signal conditioning block 320), the output 370 of the correlator 360 will show a peak. The delay 340 will be varied in order to find the value(s) at which the correlator output 370 shows a peak. The largest value of the delay 340 at which a significant peak in the correlator output 370 occurs is assumed to represent the difference 230 in arrival times between the secondary image 210 and the direct-path image 200. It is important to perform the operation for values of delays 340 in the range of zero to at least the maximum delay spread expected between a direct path image 200 and a significant secondary image 210 in the system environment, plus the additional delay imposed by the signal conditioning 320. In some circumstances, such as within large mountain ranges, the delay spread alone may be in the tens of microseconds, and the additional conditioning delay is entirely dependent on the implementation. The delayed received waveform 350 is identical to the received waveform 310, but delayed by the desired amount.

Figure 4:
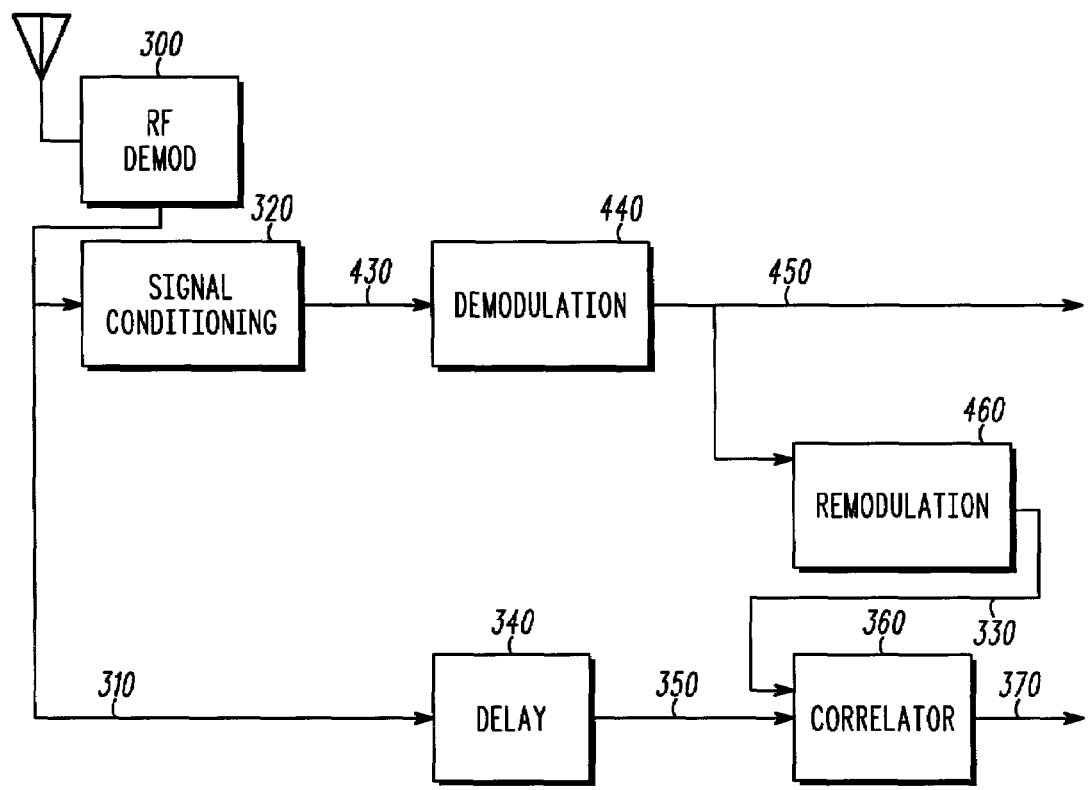
FIG. 4 illustrates a more sophisticated form of the present invention, wherein an image of the signal is demodulated, and the demodulated representation of the image is used to represent the transmitted signal.

A more sophisticated approach is illustrated in FIG. 4. In this example, the received signal 310 is not only optionally conditioned to produce a conditioned signal 430, but further demodulated by a demodulation block 440 into a digital signal 450 representing the digital information originally transmitted. This information is the most important characteristic of the transmitted signal from a communications system standpoint. The process of demodulating the signal may include, but is not limited to, detection of the original sequence of symbols sent, translation of the sequence of symbols into a sequence of bits or other information content, recovery of clock, edge, or other synchronization, error detection, and error correction. If necessary, the digital waveform 450 may be converted back into a modulated comparison waveform 330 by a remodulation block 460 for comparison with the delayed received signal 350. This may not be necessary for modulation techniques, such as binary phase shift keying ("BPSK"), where the digital waveform 450 inherently bears a strong similarity to the modulated waveform 330, but will be required for such modulation techniques as frequency shift keying ("FSK"), minimal shift keying ("MSK"), quadrature phase shift keying ("QPSK"), offset quadrature phase shift keying ("OQPSK"), quadrature amplitude modulation ("QAM"), or others where the modulation affects the analog waveform in more indirect or abstract ways.

Again, it must be observed that the sensitivity of the system to the direct-path signal 200 is directly related to the degree to which the comparison waveform 330 represents the original transmitted signal. In many cases, remodulation of the demodulated information may adequately represent that transmitted signal. However, there are a number of circumstances where this may be less than optimal. A set of characteristics, referred to as errors, which can be defined as unintentional modulation of the signal, cause the idealized remodulated waveform 330 generated from knowledge of the demodulated information to differ from the actual transmitted signal. When significant modulation errors are expected in normal system operation, the demodulation block 440 will include techniques to detect, characterize, and compensate for them in the process of recovering the digital signal 450.

These errors may include, but are not limited to, differences in the timebases of the transmitter 150 and the receiver 160 (frequency offset), unintended variations in the amplitude of the transmitted signal (envelope variation), jitter or other errors in the boundaries between transmitted symbols (symbol skew), inter-symbol interference (ISI), variations in the carrier frequency of the transmitted signal over the course of the message (frequency variation), and errors in the orthogonality of I (in-phase) and Q (quadrature) oscillators in either the transmitter 150, the receiver 160, or both (axis skew).

Figure 5:
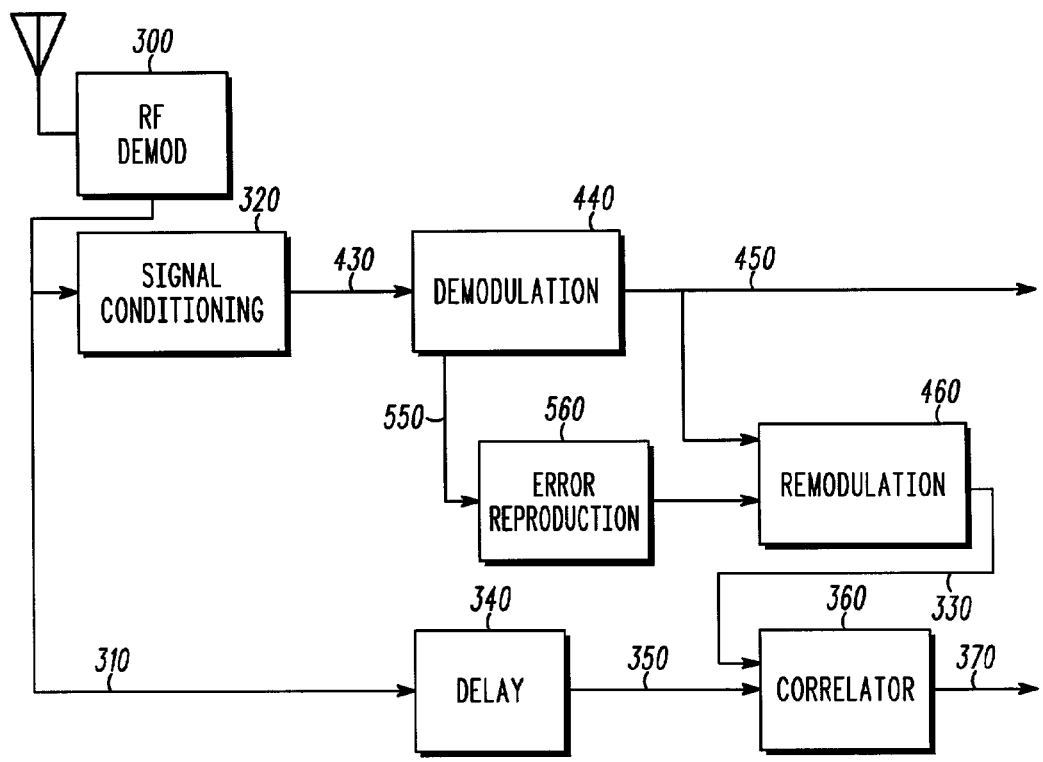
FIG. 5 illustrates a further refinement of the implementation of FIG. 4, wherein unintentional modulation of the transmitted signal is applied to the re-modulation process in order to improve the representation of the transmitted signal.

FIG. 5 illustrates a system designed to recover those errors and reintroduce them to further improve the resemblance of the comparison signal to the original transmitted signal. Error information 550 detected by the demodulation block 440 in the process of decoding the digital signal 450 are passed to the error reproduction block 560, which applies them in the remodulation block 460 to the comparison signal 330. By including the reproduced errors in the remodulation process, a comparison signal 330 is generated which bears a closer resemblance to the transmitted waveform and improves the ability of the correlator 360 to detect other images of the signal. This results in an improvement of sensitivity in direct proportion to the improvement in the similarity of the comparison waveform to the transmitted signal.

In some cases, it is more practical to apply this correction to the received waveform 310 or the delayed received waveform 350. For instance, a frequency offset error between the transmitter and receiver will result in a constant rate of phase shift observed by the demodulation block 440. For the purposes of the present invention, this error information may be incorporated either by reapplying that phase shift to the comparison signal 330 to improve its resemblance to the transmitted signal, or it may be applied as a correction to the delayed received waveform 350.

Figure 6:
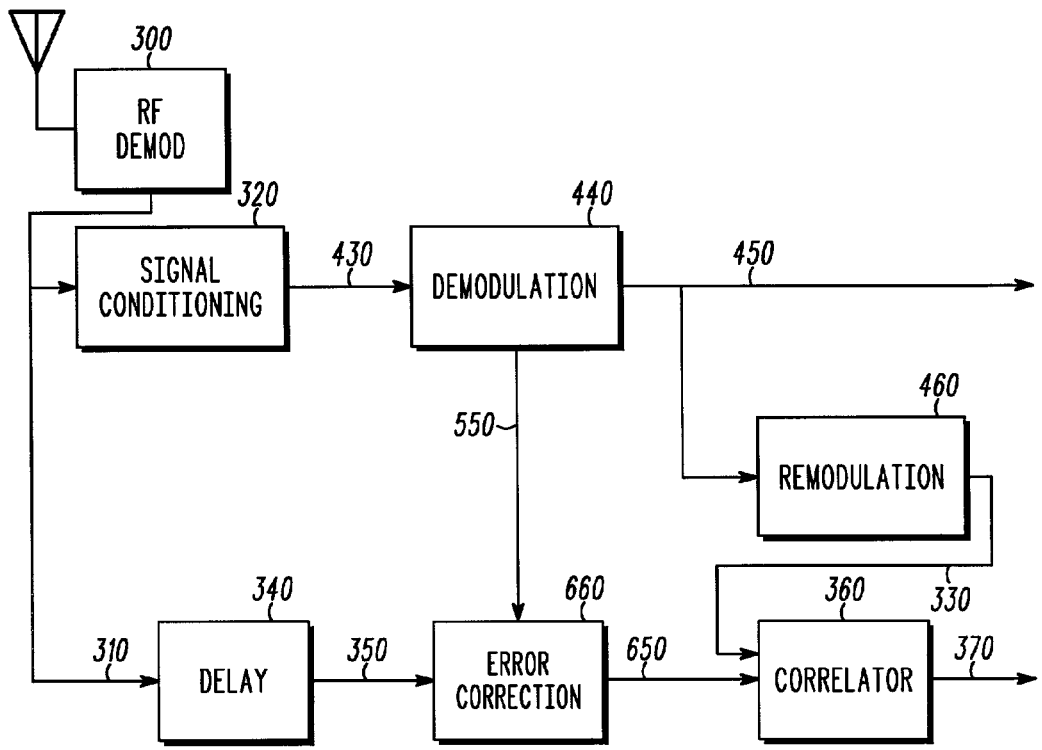
FIG. 6 illustrates a refinement similar to that of FIG. 5, wherein the unintentional modulation of the transmitted signal is applied as a correction to the received signal rather than as a modification to the re-modulation of the detected signal.

FIG. 6 illustrates an implementation of the present invention where error data is applied to the delayed received waveform 350 instead of to the comparison waveform 330. The error information 550 detected by the demodulation block 440 is passed to the error correction block 660. The error correction block 660 applies a correction to the delayed received signal 350, resulting in a corrected delayed received signal 650 which is passed to the correlator. The correction will result in the images of the transmitted signal contained in the delayed received signal 650 bearing a closer resemblance to the ideal remodulated signal represented in the comparison signal 330. This will produce a corresponding improvement in the ability of the correlator 360 to detect the images of the transmitted signal.

In some cases, the error correction 660 may be applied to the received signal 310 before it is delayed by the delay element 340. In most cases, however, it will be desirable to apply the correction to the delayed received signal 350, since the error information 550 from the demodulator will be valid only when an image has been detected. If the error correction 660 is applied before the delay element 340, some real-time architectures may fail to apply the correction to images of the transmitted signal arriving earlier than the image decoded by the demodulation block 440.

It will be apparent to those skilled in the art of signal processing that the implementation of FIG. 5, wherein the detected errors are used to represent the transmitted signal more accurately in the comparison signal 330, and the implementation of FIG. 6, wherein the detected errors are used to correct the delayed received signal, represent variations of the same technique, and are mathematically equivalent. An implementation of this invention may use either of these techniques, or as easily may combine the two, as appropriate to the signaling used and the operating conditions involved. It will be further apparent that additional improvements may be obtained by detecting additional images of the transmitted signal and combining the characterizations of all detected images to further improve the sensitivity of the system to weaker images, either simultaneously or iteratively.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

We claim:

1. A method for detecting a first image of a transmitted signal within a received signal containing a plurality of images of the transmitted signal, the method comprising the steps of:
   detecting a second image of the transmitted signal;
   determining a set of characteristics of the second image of the transmitted signal; and
   using the set of characteristics to detect the first image of the transmitted signal, wherein the second image of the transmitted signal has a higher amplitude than the first image of the transmitted signal.

2. The method of claim 1 wherein the first image is a direct-path image and the second image is a secondary image.

3. The method of claim 1 wherein the set of characteristics is at least one characteristic of the transmitted signal selected from a group consisting of: a sequence of bits, a sequence of symbols, a waveform, phase, amplitude, frequency offset, frequency variation, envelope variation, symbol skew, axis skew, and inter-symbol interference.

4. The method of claim 1 wherein the first image and the second image are distinct images of the transmitted signal.

5. The method of claim 1 wherein the step of using the set of characteristics comprises the step of performing coherent averaging over a length of time to detect the first image of the transmitted signal.

6. The method of claim 1 further comprising the step of converting the received signal to a received waveform.

7. The method of claim 6 wherein the received waveform is used as a characteristic of the transmitted signal.

8. The method of claim 6 further comprising the steps of:
   applying signal processing to the received waveform to obtain a processed received waveform; and
   using the processed received waveform as a characteristic of the transmitted signal.

9. The method of claim 8 wherein the signal processing comprises at least one of the following techniques: limiting, companding, and filtering.

10. The method of claim 6 further comprising the step of applying an error correction to the received waveform.

11. The method of claim 1 further comprising the steps of:
    demodulating the second image of the transmitted signal to determine at least a portion of information content modulated onto the signal image by a transmitter; and
    using the information content as a characteristic of the transmitted signal to detect the first image of the transmitted signal.

12. The method of claim 11 further comprising the steps of:
remodulating the information content; and
using the remodulated information content as a characteristic of the transmitted signal.

13. The method of claim 11 further comprising the steps of:
characterizing at least one error in the second image of the transmitted signal; and
using at least one characterized error as a characteristic of the transmitted signal.

14. The method of claim 1 wherein the second image of the transmitted signal arrives at a receiver at a later time than the first image of the transmitted signal.

15. The method of claim 1 wherein the step of determining a set of characteristics comprises the step of decoding at least a portion of information that is modulated on the transmitted signal prior to detecting the first image of the transmitted signal.

16. The method of claim 1 further comprising the step of converting the second image to a waveform, wherein the waveform is assumed to substantially represent a dominant image of the transmitted signal.

17. The method of claim 16 further comprising the steps of:
comparing the waveform with a second waveform that has been delayed; and
performing an operation for values of delays in a range of zero to at least a maximum delay spread expected between the first image and the second image of the transmitted signal.

18. The method of claim 1 wherein information content of the first image is reduced after the set of characteristics of the second image is determined.

19. The method of claim 1 wherein a coding gain of the first image is increased after the set of characteristics of the second image is determined.

* * * * *